United States Patent
Floyd

[11] Patent Number: 5,830,978
[45] Date of Patent: Nov. 3, 1998

[54] RESIN COMPOSITION

[75] Inventor: William C. Floyd, Chester, S.C.

[73] Assignee: Sequa Chemicals, Inc., Chester, S.C.

[21] Appl. No.: 420,356

[22] Filed: Apr. 11, 1995

Related U.S. Application Data

[63] Continuation-in-part of Ser. No. 350,692, Dec. 7, 1994, Pat. No. 5,539,077.

[51] Int. Cl.$^6$ .................................................... C08G 12/12

[52] U.S. Cl. ........................................................
528/245; 528/245; 528/249; 528/252; 528/256; 525/509; 525/540; 428/278; 428/290

[58] Field of Search ........................................................
528/245, 528/249, 252, 256; 529/509, 540; 428/278, 290

[56] References Cited

U.S. PATENT DOCUMENTS

| | | | |
|---|---|---|---|
| 4,835,320 | 5/1989 | Blanc et al. | 568/465 |
| 4,851,577 | 7/1989 | Chastrette et al. | 564/208 |
| 4,854,934 | 8/1989 | Wilhelm et al. | 8/185 |
| 4,968,774 | 11/1990 | Didier et al. | 528/245 |

FOREIGN PATENT DOCUMENTS 9410186  4/1994  France.

*Primary Examiner*—Samuel A. Acquah
*Attorney, Agent, or Firm*—Mitchell D. Bittman

[57] ABSTRACT

A resin composition useful as a binder is provided comprising the reaction product of an amine derivative chosen from melamine, glycolurile or their mixtures with a $C_1$ to $C_8$ dialkoxyethanal, the reaction product is then reacted with a polyol.

21 Claims, No Drawings

RESIN COMPOSITION

This application is a continuation-in-part of 08/350,692 filed Dec. 7, 1994, now U.S. Pat. No. 5,539,077.

BACKGROUND OF THE INVENTION

A non-formaldehyde alternative to phenol and melamine resins, which are based on formaldehyde, has been desired because of regulatory and health concerns regarding formaldehyde. Due to the high performance, strength and rigidity of these thermosetting formaldehyde-based resins in industrial applications, replacement products maintaining suitable performance have been difficult to find. This invention discloses a resin composition which performs in many applications like phenol-formaldehyde and melamine-formaldehyde resins, but contain no phenol or formaldehyde. These are thermosetting, film-forming compositions which offer tensile strength, rigidity and water-resistance comparable to the phenol-formaldehyde and melamine-formaldehyde resins now in use.

French Patent Application number 94-10186 filed Aug. 22, 1994 by Societe Francaise Hoechst discloses a novel aminoplast resin comprising the reaction product of an amine derivative such as melamine, glycolurile or their mixtures with an aldehyde of the formula R—CHO in which R represents a dialkoxy methyl group, 1,3-dioxolan-2-yl possibly substituted up to 4 and/or 5 times by one or more alkyl groups (preferably up to $C_4$ alkyl), or a 1,3-dioxan-2-yl group possibly substituted up to 4, 5 and/or 6 times by one or more alkyl groups (preferably up to $C_4$ alkyl); in mixtures possibly with glyoxal. However, these aminoplast resins do not self-condense satisfactorily, forming films which are weak, brittle and water-sensitive. Attempts to hydrolyze the acetal groups of these resins in order to increase their reactivity resulted in degradation of the melamine ring.

Thus it is an object of this invention to improve the aminoplast resins as disclosed by French Patent Application No. 94-10186 to provide a resin which upon crosslinking provide films which are strong, hard, tough and water resistant. Applications for such improved resins include uses as binders for non-woven substrates such as glass, polyester and nylon fibers used in building materials, air filters or scrub pads, as well as for cellulose substrates such as automotive filters.

SUMMARY OF THE INVENTION

Briefly, the subject invention provides a resin composition comprising the reaction product of an amine derivative chosen from the group consisting of melamine, glycolurile or their mixtures with a $C_1$ to $C_8$ dialkoxyethanal (which may also be referred to as a dialkoxyacetaldehyde or a glyoxal monoacetal), the reaction product is then mixed with a polyol having 2 or more hydroxyl groups. Optionally the amine derivative and dialkoxyethanal can also be reacted with a dialdehyde, preferably glyoxal. In a preferred embodiment the polyol is reacted with the reaction product.

DETAILED DESCRIPTION

The resin composition comprises a reaction product mixed with a polyol. The reaction product is the addition product of an amine derivative with dialkoxyethanal. The amine derivative is either melamine, glycolurile or a mixture thereof, with melamine preferred because the products provide stronger and tougher films.

The $C_1$–$C_8$ dialkoxyethanal is reacted with the amine derivative generally at a molar ratio of 1 to 6 equivalents of dialkoxyethanal to melamine and 1 to 4 equivalents for glycolurile, preferably 2 to 4 equivalents of dialkoxyethanal to the amine derivative. In addition a dialdehyde, preferably glyoxal, can also be included in the reaction product in order to provide branching points in the molecular structure, and to promote a higher molecular weight. The dialdehyde is added generally at a level of 0.05 to 3 preferably 0.5 to 1, molar equivalents of aldehyde to the amine derivative.

The $C_1$ to $C_8$ dialkoxyethanal generally has the following formula:

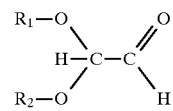

wherein $R_1$ and $R_2$ are $C_1$–$C_8$ alkyl or $R_1$ and $R_2$ are joined to form a cyclic dioxolano or a dioxano substituent. The $C_1$ to $C_8$ dialkoxyethanol can also be described as a glyoxal monacetal in which the acetal is comprised of linear substituents or is a cyclic acetal. Preferably $R_1$ and $R_2$ are a $C_1$–$C_4$ alkyl group, preferably the same group and preferably a methyl group as this is the most economical derivative which is commercially available, manufactured by Societe Francaise Hoechst and sold under the trademark Highlink DM (TM).

In addition to the reaction product a polyol having 2 or more hydroxyl groups is mixed in to form the resin composition. Suitable polyols include dialkylene glycol, polyalkylene glycol, glycerin, alkoxylated glycerin, polyvinyl alcohol, dextrose (and dextrose oligomers and derivatives), starch, starch derivatives, polyglycidol or polysaccharrides (and derivatives). Preferred polyols are dipropylene glycol, tripropoxylated glycerin, polyvinyl alcohol and mixtures thereof. The polyol is added at a level of at least 0.05 molar equivalents of polyol to the reaction product, preferably at least 0.1 molar equivalents. Generally the resin composition comprises an amount of about 1% to 99%, with 15–50% preferred of polyol by weight (dry basis) of the resin composition. Through the addition of a polyol to the reaction product a resin is provided which upon crosslinking provides films which are strong, hard, tough and water resistant.

In a preferred embodiment the polyol is reacted with the reaction product. The resultant resin composition has been shown to have significantly improved properties, namely improvement in ambient tensile and hot wet tensile for a textile product using the resin composition as a binder where the polyol is reacted with the reaction product verses being mixed with the reaction product. Generally the polyol is reacted with the reaction product under the following conditions: 75° to 110° C., or at reflux; at a pH of 4–7, preferably 5.5 to 6.5; and for a time period of 0.5 to 5 hours, preferably 2–3 hours.

The addition of an acid catalyst to the resin composition is also desirable. Suitable catalysts are sulfuric acid, hydrochloric acid, phosphoric acid, p-toluene sulfonic acid, methane sulfonic acid, aluminum salts such as aluminum hydroxychloride and aluminum chloride, magnesium chloride, zirconium sulfate and zinc chloride and the like. These catalysts facilitate the reaction(s) which effects the crosslinking. The acid catalyst is generally added in an amount of 0.1% to 15% preferably, 1% to 10% based on the weight (dry basis) of the reaction product.

The resin composition obtained herein contains neither phenol nor formaldehyde but has been found to maintain the strength and integrity of phenolic resins under conditions of severe usage including high temperature and water immersion. This resin composition is useful as a binder for cellulosic automotive oil filters, or for fiberglass in such uses as fiberglass, textiles or insulation. The resin composition can be added to a hydroxyl containing polymer (e.g. polyvinyl alcohol) wherein the resin composition is used to crosslink the polymer.

EXAMPLE I

A reaction product of melamine with dimethoxyethanal was prepared as follows: 12.6 g (0.1 mole) melamine was mixed at ambient temperature with 31.2 g (0.3 mole) of dimethoxyethanal in solution with 31.2 g of water and an amount of 30% soda (sodium hydroxide) for obtaining a pH around 9. This mixture was then heated under agitation, for 2 hours at 60° C. while maintaining the pH around 9 with adjustment, if necessary, with as many drops of 30% soda by weight as needed. This reaction product was a clear yellow liquid of 54% active solids after dilution with 6 g of water.

EXAMPLE II

A reaction product of melamine, glyoxal and dimethoxyethanal was prepared as follows: 252 g (2 moles) melamine was mixed at ambient temperature with 145 g (1 mole) glyoxal in aqueous solution at 40% by weight, 416 g (4 moles) dimethoxyethanal in solution with 277 g of water and an amount of 30% soda by weight for obtaining a pH around 7. The mixture is next heated under agitation for 2 hours at 60° C. while maintaining the pH at around 7 by addition if necessary of as many drops of 30% soda as needed. Approximately 1090 g of an aqueous solution containing approximately 726 g of an aminoplast resin according to the invention was obtained.

EXAMPLE III

A resin prepared as in Example II was comprised of 1 equivalent of glyoxal, 2 equivalents of melamine and 4 equivalents of dimethoxyethanal (60% aqueous solution) reacted together. It was a clear, viscous liquid of 67% solids. A series of blends was prepared using this resin, p-toluene sulfonic acid (pTSA) in isopropanol (IPA, 1:1) as catalyst, and various amounts of either diethylene glycol (DEG) or dipropylene glycol (DPG). Samples of these mixtures weighing 2.0 grams were cured for 75 minutes at 130° C. and evaluated for film properties. Water sensitivity was evaluated by placing 0.5 g of crushed resin in a Gardener viscosity tube and filling to the mark with deionized water. The tube was stoppered and shaken, then observed after 1 hour and color recorded on the Gardner scale. The formulations in Table 1 were used in this example.

TABLE 1

| | A | B | C | D | E | F | G | H | J | J | K |
|---|---|---|---|---|---|---|---|---|---|---|---|
| Resin | 10 | 10 | 10 | 10 | 10 | 10 | 10 | 10 | 10 | 10 | 10 |
| pTSA/IPA | 0.6 | 0.6 | 0.6 | 0.6 | 0.6 | — | 0.6 | 0.6 | 0.6 | 0.6 | 0.6 |
| DEG | 5.80 | 2.90 | 1.96 | 0.98 | — | — | — | — | — | — | — |
| DPG | — | — | — | — | — | — | 7.3 | 3.7 | 2.5 | 1.24 | 5.5 |

Results

| Sample | Gardner Color | Comments |
|---|---|---|
| A | 18+ | Hard, flexible film, black, didn't bubble, adhered to pan. |

TABLE 1-continued

| B | 4.5 | Harder than A, strong, bubbled slightly, black, brittle. |
| C | 2.0 | Hard, strong, bubbled. Very dark brown, brittle. |
| D | 1.0 | Similar to C, dark brown. |
| E | 9.0 | Very brittle, weak, amber, bubbled. |
| F | 6.5 | Very brittle, weak, amber, bubbled less than E. |
| G | 1.0 | Dark brown, hard, strong, brittle. |
| H | <1 | Darker brown than G, hard, strong, brittle. |
| I | <1 | Very dark brown, hard, strong, brittle. |
| J | <1 | Black, hard, strong, less brittle. |
| K | <1 | Black, hard, strong, less brittle. |

These results show the resins utilizing DEG are sensitive to water, as evidenced by the development of color on the Gardner scale, while those employing DPG are significantly more water resistant. The DPG resins formed films similar in appearance to the DEG resins as far as color, hardness, brittleness and strength, but did not soften or discolor the water upon prolonged soaking. Cured phenolic and melamine-formaldehyde resins are known for their resistance to water. Varying the amounts of glycols also affects the degree of brittleness, strength and hardness.

EXAMPLE IV

A resin prepared as in Example I consisted of 3 molar equivalents of dimethoxyethanal (DME) reacted onto 1 molar equivalent of melamine. This product was a clear, pale yellow liquid of 55% active solids. This resin was evaluated as a replacement for melamine-formaldehyde resin as a binder on filter paper. The resin was evaluated alone and with various polyols according to the formulations of Table 2. Aluminum chloride solution was found to be a suitable catalyst for the resin, but caused precipitation of the melamine formaldehyde resin. Phosphoric acid was therefore used as catalyst for the melamine formaldehyde resin. The polyols evaluated included Ethox PGW (glycerine reacted with 3 equivalents of propylene oxide, from Ethox Corp., Greenville, S.C.) polyvinyl alcohol (fully hydrolyzed, ultra low molecular weight, such as Airvol 103, Air Products, Allentown, Pa. or Mowiol 3-98 or 4-98, Hoechst Celanese Corp., Somerville, N.J.) or the same polyvinyl alcohol (PVOH) which has been reacted with 5% glyoxal. The formulations (by dry weight) of Table 2 were applied to Whatman filter paper, achieving a 19% add-on. The paper was dried and cured for 5 minutes at 177° C. (350° F.). The paper was tested for wet and dry Mullen Burst, wet and dry Gurley Stiffness and tensile strength at ambient temperature, 105° C. (220° F.), 160° C. (320° F.) and 216° C. (420° F.). Results are displayed in Table 3.

TABLE 2

| | A | B | C | D | E | F | G | H | I |
|---|---|---|---|---|---|---|---|---|---|
| Resin | 95 | | 90 | 70 | 70 | 70 | 70 | 70 | 70 |
| AlCl$_3$ solution | 5 | | 10 | 5 | 5 | 5 | | 5 | 5 |
| Melamine-formaldehyde resin | | 95 | | | | | | | |
| H$_3$PO$_4$ | | 5 | | | | | | | |
| PVOH/Glyoxal | | | | | 8.3 | | 16.7 | 25 | |
| PVOH | | | | 8.3 | | 16.7 | | | 25 |
| EthoxPGW | | | | 16.7 | 16.7 | 8.3 | 8.3 | | |

TABLE 3

|  | A | B | C | D | E | F | G | H | I |
|---|---|---|---|---|---|---|---|---|---|
| Mullen, dry (lbs) | 8.0 | 8.8 | 8.8 | 11.6 | 15.0 | 6.6 | 12.2 | 15.0 | 13.8 |
| wet | 0.8 | 9.6 | 5.6 | 7.8 | 14 | 9.4 | 11.0 | 9.4 | 10.4 |
| Gurley, dry (MD) | 526 | 606 | 428 | 482 | 511 | 562 | 562 | 555 | 526 |
| wet | 295 | 348 | 304 | 266 | 215 | 273 | 229 | 222 | 237 |
| Tensile, RT(Kg) | 8.3 | 7.4 | 5.9 | 8.6 | 9.2 | 7.9 | 8.9 | 9.7 | 9.1 |
| elongation, % | 1.6 | 1.3 | 1.2 | 1.6 | 1.7 | 1.3 | 1.8 | 2.0 | 1.6 |
| 105° C. | 5.9 | 6.5 | 5.6 | 6.5 | 6.8 | 5.5 | 7.1 | 6.9 | 7.1 |
| elongation, % | 1.1 | 1.2 | 1.0 | 2.1 | 4.4 | 1.7 | 1.3 | 1.5 | 2.0 |
| 105° C. | 5.6 | 4.4 | 4.6 | 5.4 | 6.5 | 5.0 | 4.8 | 7.1 | 5.3 |
| elongation, % | 1.1 | 0.8 | 0.9 | 1.2 | 1.4 | 0.9 | 1.1 | 1.4 | 2.6 |
| 215° C. | 4.3 | 4.3 | 4.0 | 4.8 | 4.6 | 3.9 | 4.6 | 4.4 | 3.9 |
| elongation, % | 1.3 | 1.2 | 1.3 | 2.2 | 3.1 | 1.0 | 1.4 | 1.4 | 1.3 |

These results show that the melamine/DME resin by itself and in combination with various polyols, can achieve performance as a filter paper binder comparable to or superior to a melamine/formaldehyde resin. These melamine/DME systems achieve this performance without use of formaldehyde. The presence of certain polyols are seen to provide performance superior to the melamine/DME resin alone on paper.

EXAMPLE V

Various melamine/DME-polyol combinations were evaluated against a melamine/formaldehyde (MF) resin and a phenol/formaldehyde (PF) resin as controls. The MF resin is the same used in Example IV. The PF resin is a precondensed aqueous resin having pH of 8.4, Brookfield viscosity of 760 cps, solids (by refractive index) of 68% and 2% free formaldehyde. The resins were padded onto Whatman filter paper, dried and cured at 350° F. (177° C.) for 5 minutes. The % add-on ranged from 19.6 to 20.4. The phenolic resin readily dispersed in the aqueous pad bath, but coagulated upon addition of catalyst. Therefore, it was applied without catalyst. The paper was tested for dry Mullen burst, Mullen burst after a 5 minute boil, cross-directional tensile at ambient temperature, 220° F. (104° C.), 320° F. (160° C.), 420° F. (216° C.), and Gurley stiffness (MD and CD). Formulations are shown in Table 4 and results in Table 5.

TABLE 4

|  | 1 | 2 | 3 | 4 | 5 | 6 | 7 | 8 |
|---|---|---|---|---|---|---|---|---|
| Phenolic resin | 100 | | | | | | | |
| MF resin | | 95 | | | | | | |
| Resin | | | 95 | 70 | | 70 | 70 | 45 |
| AlCl₃ soln. | | | 5 | 5 | | 5 | 5 | 5 |
| Ethox PGW | | | | 16.7 | | 16.7 | | |
| PVOH/Glyoxal | | | | | 8.3 | 25 | | 50 |
| PVOH | | | | | 8.3 | | 25 | |
| H₃PO₄ | | | 5 | | | | | |

TABLE 5

|  | 1 | 2 | 3 | 4 | 5 | 6 | 7 | 8 |
|---|---|---|---|---|---|---|---|---|
| Dry Mullen, Lbs | 7.4 | 5.4 | 9.0 | 13.4 | 10.2 | 13.4 | 14.2 | 12.2 |
| Boiled Mullen, Lbs | 8.2 | 10.6 | 7.0 | 9.2 | 8.6 | 12.8 | 15.0 | 11.4 |
| CD tensile, Ambient | | | | | | | | |
| kg | 6.6 | 5.4 | 4.5 | 6.0 | 5.4 | 6.7 | 7.7 | 7.4 |
| elongation, % | 2.0 | 2.3 | 2.0 | 3.2 | 2.4 | 2.6 | 2.8 | 2.7 |
| 220° F., Kg | 5.5 | 3.9 | 4.2 | 4.4 | 3.7 | 5.6 | 5.8 | 5.7 |
| elongation, % | 1.4 | 1.2 | 1.5 | 1.6 | 1.4 | 1.6 | 1.6 | 1.4 |
| 320° F., Kg | 5.4 | 3.6 | 3.6 | 4.3 | 3.9 | 4.9 | 5.5 | 5.3 |
| elongation, % | 1.3 | 1.3 | 1.7 | 2.0 | 1.9 | 1.5 | 1.6 | 1.6 |
| 420° F., Kg | 3.9 | 2.8 | 3.6 | 3.5 | 3.1 | 4.0 | 4.1 | 4.0 |
| elongation, % | 1.4 | 1.0 | 1.2 | 2.3 | 1.9 | 1.8 | 1.7 | 1.6 |
| Gurley Stiffens, mg | | | | | | | | |
| Dry, MD | 983 | 1036 | 629 | 681 | 629 | 747 | 784 | 650 |
| CD | 836 | 703 | 518 | 562 | 459 | 611 | 622 | 533 |
| Wet, MD | 888 | 895 | 451 | 282 | 355 | 371 | 384 | 200 |
| CD | 723 | 526 | 362 | 251 | 266 | 282 | 266 | 193 |

These data show that while the melamine/DME resin alone is comparable to the MF, it is inferior to the phenolic resin. However, it is shown that the addition of certain polyols enhance the performance of the melamine/DME resin to the point of being comparable or superior to the phenolic resin in terms of burst and tensile. While the phenolic paper is stiffer than the melamine/DME paper, this is not necessarily a deficiency. Excessively stiff paper is brittle and more difficult to fold and flute to make an oil filter cartridge. This may require the filter paper to be partially cured (B-staged), fabricated into the fluted cartridge shape and subsequently fully cured. The melamine/DME resins may allow the advantage of being fully cured, yet not so brittle as to preclude folding. This could save a step in manufacturing.

EXAMPLE VI

To better understand the performance characteristics of the novel resin composition, a cure profile study was done. Resin solutions were padded onto Whatman filter paper at 20% add-on and air dried. The paper was then cured at 300° F. (149° C.), 350° F. (177° C.) or 400° F. (204° C.) for 0.5, 1, 2, 3 or 5 minutes. The paper was tested for ambient tensile strength (cross direction), wet tensile and hot tensile (220° F./104° C.). The data indicate that the resins may be applied with a light or partial cure, then fully cured at a subsequent treatment. This is comparable to "B-Staging" a phenolic resin. It is also noteworthy that some of the samples show hot wet tensile retention that is 50% to 70% of the original ambient tensile. This is an indication of a full cure. In the data table below, the cure conditions are coded as follows: A-400° F., B-350° F. and C-300° F. Sample 2 was the resin with 5% aluminum chloride catalyst (see sample #3 of Table 4). Sample 3 was 70% resin, 5% aluminum chloride and 25% fully hydrolyzed, ultra low molecular weight PVOH (see sample #7 of Table 4).

TABLE 6

Hot (220° F.) Tensile, KG

| | Time, min | | | | |
|---|---|---|---|---|---|
| Sample | 0.5 | 1.0 | 2.0 | 3.0 | 5.0 |
| 3C | 6.2 | 8.7 | 8.4 | 8.7 | 8.2 |
| 2C | 3.8 | 5.3 | 5.1 | 5.5 | 4.9 |
| 3B | 7.9 | 8.1 | 7.4 | 7.1 | 7.0 |
| 2B | 4.1 | 5.8 | 5.5 | 5.0 | 5.8 |
| 3A | 8.1 | 7.7 | 6.4 | 7.1 | — |
| 2A | 4.4 | 5.3 | 3.9 | 5.0 | — |

TABLE 7

Hot Wet Tensile, KG

| | Time, min | | | | |
|---|---|---|---|---|---|
| Sample | 0.5 | 1.0 | 2.0 | 3.0 | 5.0 |
| 3C | 0.08 | 3.0 | 4.3 | 3.5 | 4.2 |
| 2C | 0.10 | 2.0 | 1.7 | 2.2 | 2.7 |
| 3B | 0.13 | 4.2 | 5.0 | 5.2 | 4.3 |
| 2B | 0.11 | 4.0 | 4.4 | 4.5 | 4.7 |
| 3A | 0.10 | 5.1 | 5.5 | 5.0 | — |
| 2A | 0.14 | 4.6 | 4.6 | 4.0 | — |

TABLE 8

Ambient Tensile, KG

| | Time, min | | | | |
|---|---|---|---|---|---|
| Sample | 0.5 | 1.0 | 2.0 | 3.0 | 5.0 |
| 3C | 8.0 | 11.1 | 10.9 | 10.3 | 10.4 |
| 2C | 5.2 | 6.8 | 6.7 | 6.5 | 6.5 |
| 3B | 9.6 | 9.2 | 9.9 | 10.5 | 9.6 |
| 2B | 4.6 | 7.6 | 7.3 | 7.7 | 7.2 |
| 3A | 8.4 | 9.5 | 9.7 | 9.1 | — |
| 2A | 4.4 | 7.3 | 6.5 | 6.9 | — |

TABLE 9

Ratio Of Hot Wet To Ambient Tensile

| | Time, min | | | | |
|---|---|---|---|---|---|
| Sample | 0.5 | 1.0 | 2.0 | 3.0 | 5.0 |
| 3C | 0.01 | 0.27 | 0.39 | 0.34 | 0.40 |
| 2C | 0.02 | 0.29 | 0.25 | 0.34 | 0.41 |
| 3B | 0.01 | 0.46 | 0.50 | 0.49 | 0.44 |
| 2B | 0.20 | 0.52 | 0.60 | 0.58 | 0.65 |
| 3A | 0.01 | 0.54 | 0.57 | 0.55 | — |
| 2A | 0.03 | 0.63 | 0.71 | 0.58 | — |

The testing results of Tables 6–9 show that time and cure temperature can be varied to provide a wet tensile to dry tensile ratio of 0.5 or higher. This is considered "full cure".

EXAMPLE VII

The foregoing examples have shown that polyvinyl alcohol (PVOH) improves the performance of the Example I resin on paper. The Example I resin should be a suitable crosslinking agent for various formulations containing PVOH or derivatives of PVOH or similarly hydroxylated substrates. To this end, the Example I resin was utilized as a crosslinking agent for a PVOH/acrylic graft copolymer.

The graft copolymer consisted, on a dry basis, of 25% ultra low molecular weight, fully hydrolyzed PVOH grafted with 43.5% ethyl acrylate, 0.75% butyl acrylate, 1.5% bis-phenol-A-diepoxydiacrylate and 29.25% methyl methacrylate. The latex was a white, opaque dispersion with a viscosity of 300 cps at 30% solids, with pH raised to 6.5 with ammonium hydroxide. The formulations of Table 10 were applied to non-woven polyester roofing mat and cured 3 minutes at 350° F., achieving 23–24% add-on. The mat was tested for ambient tensile strength and % elongation at 180° C. under loads ranging from 5 kg to 18 kg. Results are shown in Table 11. Sequabond® 145 (by Sequa Chemicals Inc.), a vinyl acetate/acrylic copolymer used commercially as a polymat roofing binder was used as the control. High tensile strength and low elongation values are desirable properties.

TABLE 10

| | A | B | C |
|---|---|---|---|
| Sequabond 145 | 100 | — | — |
| PVOH graft | — | 100 | 78 |
| AlCl$_3$ soln. | — | — | 4 |
| Example I | — | — | 18 |
| % Add-On | 23.5 | 23.6 | 23.7 |

TABLE 11

| | A | B | C |
|---|---|---|---|
| Ambient tensile, Kg | 26.6 | 31.4 | 26.1 |
| % elongation | 34.6 | 34.5 | 30.3 |
| % Elongation@ 180° C. | | | |
| 5 kg | 6.1 | 4.0 | 3.1 |
| 8 kg | 17.1 | 9.3 | 6.2 |
| 10 kg | 24.9 | 14.1 | 9.3 |
| 12 kg | 32.2 | 20.6 | 13.2 |
| 14 kg | 39.0 | 30.3 | 17.7 |
| 16 kg | 45.8 | 45.3 | 23.1 |
| 18 kg | 53.0 | 66.1 | 30.3 |

The results of Table 11 show that the resin of Example I can serve as a non-formaldehyde crosslinker for PVOH graft lattices with equal or better performance than that seen in commercial lattices using N-methylol acrylamide.

EXAMPLE VIII

The following examples show the added benefit derived from reacting the DME/Melamine resin with polyols, as opposed to blending them together. To a 1-liter, 3-necked flask fitted with a mechanical stirrer, thermometer and condenser was charged 477 grams of 60% aqueous dimethoxyethanal solution (2.75 moles), and 126 grams of melamine (1.00 moles). The pH was raised to 9.5 with 5% sodium hydroxide (9.2 g). The batch was then heated to 58°–60° C. for 2 hours while maintaining the pH at 9.4–9.5 with 5% sodium hydroxide. A total of 39.3 grams of 5% sodium hydroxide was added by syringe pump maintaining the pH in range during the reaction.

After the 2 hour reaction, 106.2 grams of glycerin tripropoxylate (GTP, 0.4 moles) and 70.8 grams of dipropylene glycol (DPG, 1.5 moles) were added. The pH was adjusted to 6.5 with 0.3 grams of 40% sulfuric acid and heated to reflux (102° C.) for 2 hours, then cooled. The product was a clear light amber color.

A similar product was made using a 3:1 molar ratio of DME to melamine with comparable results.

EXAMPLE IX

The DME/melamine resins prepared in Example VIII which incorporated the polyols during the reaction were compared to the condensed resin in which comparable amounts of the same polyols were added to (blended into) the formulation. These resins were applied to a non-reactive substrate (polyester non-woven mat) and compared for ambient tensile and hot wet tensile. The add-on was 20% and substrates were dried and cured for 5 minutes at 350° F. The results below show significant improvement in ambient tensile and hot wet tensile for the reacted product vs. the blend.

DME/MELAMINE/POLYOL PRODUCTS ON POLYMAT

|  | A | B | C |
|---|---|---|---|
| Al(OH) C12 | 3 | 3 | 3 |
| 3:1 DME/Mel, DPG, GTP reacted | 97 | | |
| 3:1 DME/Mel resin | | 77 | |
| DPG | | 8 | |
| GTP | | 12 | |
| 2.75:1 DME/Mel, DPG, GTP reacted | | | 97 |
| Tensile, MD, Kg | 25.8 | 19.4 | 24.6 |
| elongation, % | 54.2 | 54.4 | 60.1 |
| Hot wet tensile, MD, Kg | 18.1 | 14.6 | 18.6 |
| elongation, % | 64.5 | 51.0 | 57.6 |

EXAMPLE X

To further illustrate the utility of this invention, a dimethoxyethanal/melamine resin as described in Example I, was added at levels of 6, 9, 12, and 18% of the total binder with 3% aluminum hydroxy dichloride as catalyst, with the remainder being the PVOH graft copolymer described in Example VII. The binder was applied at 22–24% add-on to a non-woven polyester roofing mat substrate, and cured for 3 minutes at 350° F. The mat was tested for ambient tensile strength and % elongation at 180° C. under loads ranging from 5 to 18 kg. A commercial, high-performance vinyl-acrylic latex (Sequabond® 145 from Sequa Chemicals, Inc., Chester, S.C.) was used as a control. Results shown below in Table 12 show that while tensile remains fairly constant, % elongation at high temperature may be controlled by varying the amount of resin in the formulation.

TABLE 12

| Product | 1 | 2 | 3 | 4 | 5 |
|---|---|---|---|---|---|
| Sequabond ® 145 | 100 | | | | |
| PVOH Graft | | 79 | 85 | 88 | 91 |
| DME/Melamine resin | | 18 | 12 | 9 | 6 |
| Al(OH) Cl$_2$ | | 3 | 3 | 3 | 3 |
| % add-on | 23.9 | 22.8 | 23.5 | 23.4 | 22.8 |
| Results | | | | | |
| Ambient Tensile, Kg | 29.6 | 29.8 | 27.9 | 29.5 | 29.5 |
| % elongation | 38.8 | 34.5 | 36.0 | 32.8 | 35.4 |
| % ElongationE 180° C. | | | | | |
| Load, Kg: | | | | | |
| 5 | | 7.0 | 2.8 | 3.0 | 3.0 | 3.4 |
| 8 | | 17.6 | 6.3 | 6.7 | 7.0 | 8.3 |
| 10 | | 25.4 | 9.4 | 10.2 | 11.2 | 13.1 |
| 12 | | 32.8 | 13.2 | 14.3 | 16.2 | 19.3 |
| 14 | | 40.0 | 17.9 | 19.2 | 22.7 | 27.6 |
| 16 | | 47.2 | 23.7 | 25.5 | 31.6 | 41.1 |
| 18 | | 55.1 | 31.8 | 34.6 | 43.6 | 62.2 |

What is claimed is:

1. A resin composition comprising:
   the reaction product of an amine derivative chosen from the group consisting of melamine, glycolurile or their mixtures with a $C_1$ to $C_8$ dialkoxyethanal;
   and a polyol having 2 or more hydroxyl groups which is reacted with said reaction product.

2. Resin composition of claim 1 wherein the reaction product comprises a molar ratio of 1 to 6 molar equivalents of dialkoxyethanal to the melamine and 1 to 4 equivalents of dialkoxyethanal to the glycolurile and comprises at least 0.05 molar equivalents of polyol to the reaction product.

3. Resin composition of claim 2 wherein the reaction product comprises a molar ratio of 2 to 4 molar equivalents of dialkoxyethanol to the amine derivative and comprises at least 0.1 molar equivalents of polyol to the reaction product.

4. Resin composition of claim 1 further comprising a dialdehyde.

5. Resin composition of claim 4 wherein the dialdehyde is glyoxal.

6. Resin composition of claim 5 wherein the reaction product comprises 0.05 to 3 molar equivalents of glyoxal to the amine derivative.

7. Resin composition of claim 6 wherein the reaction product comprises 0.5 to 1 molar equivalents of glyoxal to the amine derivative.

8. Resin composition of claim 1 wherein the polyol is selected from the group consisting of dialkylene glycol, polyalkalene glycol, glycerine, alkoxylated glycerin, polyvinyl alcohol, dextrose, dextrose oligomers, polysaccharide derivatives, starch, starch derivatives, polyglycidol, polysaccharide, polysaccharide derivatives and their mixtures.

9. Resin composition of claim 8 comprising 1 to 99% by weight of polyol by weight of the resin composition.

10. Resin composition of claim 9 wherein the polyol as chosen from the group consisting of dipropylene glycol, tripropoxylated glycerin, polyvinyl alcohol and mixtures thereof.

11. Resin composition of claim 8 comprising 5 to 50% by weight of polyol by weight of the resin composition.

12. Resin composition of claim 1 further comprising an acid catalyst.

13. Resin composition of claim 12 comprising 0.1% to 15% of acid catalyst by weight of the reaction product.

14. Resin composition of claim 13 wherein the acid catalyst is chosen from the group consisting of sulfuric acid, hydrochloric acid, phosphoric acid, p-toluene sulfonic acid, aluminum chloride, magnesium chloride, zirconium sulfate, zinc chloride, methane sulfonic acid and aluminum hydroxychloride.

15. Resin composition of claim 1 wherein the $C_1$ to $C_8$ dialkoxyethanal has the following formula:

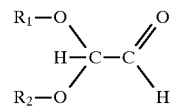

wherein $R_1$ and $R_2$ are $C_1$–$C_8$ alkyl or $R_1$ and $R_2$ are joined to form a cyclic dioxolano or a dioxano substituent.

16. Resin composition of claim 15 wherein $R_1$ and $R_2$ are $C_1$–$C_4$ alkyl group.

17. Resin composition of claim 16 wherein $R_1$ and $R_2$ are a methyl group.

18. Resin composition of claim 16 wherein $R_1$ and $R_2$ are the same.

19. Resin composition of claim 1 further comprising a hydroxyl-containing polymer, wherein the resin composition is used to crosslink said polymer.

20. Process for binding a substrate comprising applying the resin composition according to any of claims 1, 3, 6, 8, 12, 17 and 19 to a substrate, followed by curing the resin to crosslink the binder.

21. Process of claim 20 wherein the substrate is chosen from the group consisting of glass, polyester, nylon, non-woven substrates and cellulose substrates.

* * * * *